United States Patent
Bunkers

(10) Patent No.: US 10,477,997 B1
(45) Date of Patent: Nov. 19, 2019

(54) CARBONATED BEVERAGE NUCLEATION ACCESSORY

(71) Applicant: Bryce Bunkers, Crystal, MN (US)

(72) Inventor: Bryce Bunkers, Crystal, MN (US)

(*) Notice: Subject to any disclaimer, the term of this patent is extended or adjusted under 35 U.S.C. 154(b) by 334 days.

(21) Appl. No.: 15/356,464

(22) Filed: Nov. 18, 2016

Related U.S. Application Data

(62) Division of application No. 14/103,189, filed on Dec. 11, 2013, now abandoned.

(51) Int. Cl.
*A47G 19/22* (2006.01)

(52) U.S. Cl.
CPC .................. *A47G 19/2233* (2013.01)

(58) Field of Classification Search
CPC .... C12G 1/0206; C12H 1/14; A47G 19/2233; B65D 85/73
USPC ............. 99/277, 277.1, 323.1; 426/112, 115, 426/330.4, 329, 487
See application file for complete search history.

(56) References Cited

U.S. PATENT DOCUMENTS

| | | | |
|---|---|---|---|
| 1,806,730 A | 5/1931 | Alland | |
| 2,445,170 A | 7/1948 | Gonczi | |
| 2,577,259 A | 12/1951 | Millington | |
| 3,357,204 A | 12/1967 | Albert | |
| 3,589,009 A | 6/1971 | Miscavich et al. | |
| 4,214,011 A * | 7/1980 | Strube .............. | A23L 2/40 426/477 |
| 4,322,008 A | 3/1982 | Schneider | |
| 5,386,658 A | 2/1995 | Ferguson et al. | |
| 5,620,725 A | 4/1997 | Jamieson et al. | |
| 5,660,867 A | 8/1997 | Reynolds et al. | |
| 5,780,083 A | 7/1998 | Wright et al. | |
| D401,404 S | 11/1998 | Raterink | |
| 6,158,914 A | 12/2000 | Junkins | |
| 7,228,789 B1 | 6/2007 | Mondszein et al. | |
| 7,971,801 B2 | 7/2011 | Spangler | |
| D674,718 S | 1/2013 | Collison | |

(Continued)

FOREIGN PATENT DOCUMENTS

| | | |
|---|---|---|
| EP | 0597606 A | 5/1994 |
| GB | 2345280 A | 7/2000 |

(Continued)

OTHER PUBLICATIONS

Steve Spangler Science, Dancing Raisins—The Bubble Lifter, http://www.stevespanglerscience.com/lab/experiments/dancing-raisins-the-bubble-lifter.

(Continued)

*Primary Examiner* — Thien S Tran
(74) *Attorney, Agent, or Firm* — Kinney & Lange, P.A.

(57) ABSTRACT

I disclose a method for increasing a quantity of gas bubbles in a head of foam of a beverage in drink ware, comprising providing and sinking a portable nucleation accessory into the beverage. The nucleation accessory features a plurality of nucleation sites etched into a smooth outer surface of the accessory. Each nucleation site comprises a pit which pulls and aggregates gases out of solution until the gases forms a bubble. When the bubble becomes sufficiently buoyant, it detaches from the nucleation site and rises to an upper surface of the beverage. A plurality of nucleation sites producing bubbles in this way build a head of foam on the upper surface of the beverage. Nucleation sites may be arranged to appear as lines or areas to a naked eye.

15 Claims, 3 Drawing Sheets

(56) References Cited

U.S. PATENT DOCUMENTS

| | | | | |
|---|---|---|---|---|
| 2002/0000678 A1* | 1/2002 | Takai | ................ | A47G 19/2233 |
| | | | | 261/122.1 |
| 2010/0089860 A1 | 4/2010 | Wiggins et al. | | |
| 2014/0154383 A1* | 6/2014 | Beck | .................... | C12G 1/0206 |
| | | | | 426/487 |
| 2015/0217933 A1* | 8/2015 | Price | ................. | A47G 19/2233 |
| | | | | 426/106 |

FOREIGN PATENT DOCUMENTS

| | | | | |
|---|---|---|---|---|
| GB | 2346280 A | | 7/2000 | |
| JP | 10234549 A | * | 9/1998 | |
| JP | 2003061804 A | * | 3/2003 | |
| WO | 9722538 A | | 6/1997 | |
| WO | 9838111 A | | 9/1998 | |
| WO | 9847387 A | | 10/1998 | |
| WO | WO-2014027028 A1 | * | 2/2014 | ......... A47G 19/2233 |

OTHER PUBLICATIONS

University of Wisconsin, Chemistry Department, "Dancing Raisins Experiment," http://scifun.chem.wisc.edu/homeexpts/dancingraisins.htm.

Steve Spangler Science, Dancing Raisins'The Bubble Lifter, https://www.stevespanglerscience.com/lab/experiments/dancing-raisins-the-bubble-lifter/ , accessed Nov. 3, 2017, 5 pages.

University of Wisconsin, Chemistry Department, "Dancing Raisins Experiment", http://scifun.chem.wisc.edu/HomeExpts/dancingraisins.htm , accessed Nov. 3, 2017, 2 pages.

* cited by examiner

CARBONATED BEVERAGE NUCLEATION ACCESSORY

CROSS-REFERENCE TO RELATED APPLICATION

This application claims priority to U.S. Provisional Patent Application 61/896,459, filed Oct. 28, 2013 and U.S. Non-Provisional application Ser. No. 14/103,189, filed Dec. 11, 2013.

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

This invention relates to portable, reusable and sanitary accessories which increase the quantity of foam in a head in carbonated beverages, particularly alcoholic carbonated beverages, and most particularly, beer.

BACKGROUND OF THE INVENTION

Connoisseurs of beer have long come to appreciate the taste, texture, and aesthetics of the foamy head of froth. Beer is a solution of water, carbohydrates, proteins, acids and dissolved, invisible gases such as carbon dioxide $CO_2$ and nitrogen $N_2$. In liquid beer some of these gases remain dissolved in solution, invisible to a naked eye and intangible to the tongue. Others of the gases aggregate out of solution, to form visible, tangible and undissolved bubbles. After these bubbles become a certain size, they become sufficiently buoyant to rise to an upper surface of the beverage. Enough of these bubbles rise to form visible and tangible foam, or "head." Each bubble is surrounded by a coating of amino acids derived from cereal grains, yeast, and hops during the brewing process. The coating helps the bubbles remain longer on the surface. Smaller bubbles remain longer. Denser amino acids remain longer.

Some beer styles have medium or high carbonation. Ideally, the gases are released slowly and steadily throughout consumption. Drinking a beer straight from cans or bottles limits the release of dissolved carbon dioxide or nitrogen for beer styles with medium or high carbonation. The problem with cans or bottles is, the mouth is too narrow and there is little energy to release the dissolved gas. Heat transfers in, from either ambient air or a consumer's hand, only releasing subtle amounts of gas. Motion from drinking and swirling a beer container also releases only subtle amounts of carbon dioxide. For beer styles with medium or high carbonation, most of the carbon dioxide gas and aroma remain dissolved in the liquid beer phase. This causes the beer to taste undesirably sour and sharp. Most carbonation is eventually ingested by the consumer.

A perfect glass of beer is a rich and complete sensory experience. Beautiful bubbles rise slowly and steadily to the top, it smells rich with hops and grain, and has a dense, foamy head that lingers on the tongue. It is known in the art to pour salt, pickles, green olives, or a raisin into carbonated drinks to release dissolved carbonation. However, these methods impart undesirable flavors and aromas to the beer. Heating beer or swirling it in its mug can also increase the release of carbonation. However, these measures are temporary, and less than ideal. Warm beer is not very refreshing. Swirling beer is tedious and often spills, creating a mess.

Pouring a beer into standard drink ware somewhat improves the quantity of foam generated. particularly for medium or highly-carbonated styles of beer. The mouth of the drink ware is wider, allowing more aroma to be released. The mere act of pouring the beer provides kinetic energy for a large initial release of dissolved gases. This results in an appealing texture and taste of foam. The drawback to standard drink ware is, after the initial pour the dissolved gas is not released steadily. The head of foam slowly begins to diminish throughout consumption. The aroma fades with it. The beer eventually appears flat. The remaining dissolved gas has no energy to collect into bubbles, instead takes on an acidic and sour taste, which is undesirable to drink.

Glassware etched with its own nucleation sites further improves unetched standard drink ware. Following the initial pour, the dissolved gases collect in nucleation sites to form bubbles visible to a naked eye. After the bubbles reach a certain size and buoyance, they detach from the nucleation sites and rise to the surface of the drink ware as foam. Nucleation sites, in this context, and understood to one of ordinary skill in the art, are defined as pits cut or etched into an otherwise smooth surface where dissolved gases collect, accumulate and form bubbles. Once these bubbles reach a certain size, they become sufficiently large and buoyant to rise to a top surface of the beverage. The more nucleation sites are created in the surface, the greater the surface area available for gases to collect, and the more bubbles form. The amount of foam can be controlled by the number of available nucleation sites.

One problem with drink ware with integral nucleation sites is its inconvenience. Drink ware etched with nucleation sites are difficult to find, and not portable. What the beverage industry really needs is an elegant, portable, sanitary and reusable way to improve the quality and quantity of the foam. The accessory disclosed here is unique for its simplicity. It is etched with its own nucleation sites. Therefore, there is no need for a specially made can, bottle, or draft dispenser. There are no intricate valves to design and no need to add additional gas. As long as it is made from a material that is not porous to beer, will not react with, dissolve in, or erode in beer, it will not impart flavor to the beverage, and the nucleation sites will not change shape, thus the accessory will not lose its nucleating power. The accessory can be used in any drink ware material, and in any beverage serving setting—at home, in a bar, seated or on-the-go. It comes with a cylindrical hole drilled therethrough along a vertical central axis oriented from the top to the bottom, so it can be easily slipped over the prongs of a conventional dishwasher and sanitized. This hole creates an inner surface, into which additional nucleation sites can optionally be etched. The accessory provides infinitely many nucleation sites all while fitting easily into a pants pocket.

To increase the esthetic appeal of the accessory, it can be shaped like an olive or the flower cone of a hop plant, although any three dimensional shapes could serve the same purpose. There is no limit to the number, shape or configuration of the nucleation sites that can be etched into the outer surface of the accessory. By way of example shown in the drawings, and not limitation, nucleation sites can be created to appear to a naked eye as lines of longitude, lines of latitude, diamonds, or circles. The nucleation site can even serve a commercial purpose, as in to form words, symbols, advertisements or logos. The gas bubble nucleation sites could even be etched into the surface of the cylindrical hole, to further extend gas bubble generating capacity.

BRIEF SUMMARY OF THE INVENTION

This beverage nucleation accessory is manufactured from a three-dimensional body of solid state material which is non-porous to beer, and further does not erode in beer or chemically react with beer.

The most preferred material is soapstone. It is inexpensive to purchase and inexpensive to tool. Soapstone can be hand-carved using a saw, chisel, knife, rasp, riffler and/or sandpaper and more finely machined using a mill or lathe. Soapstone can be smoothed via buffing, fine sandpaper and polishing oil. Whiskey stones are commonly made from soapstone. Soapstone is sufficiently dense to sink gently to the bottom of the drink ware filled with beverage, without shattering the drink ware. Soapstone does not absorb beer, does not erode in beer, does not impart flavor to beer, and is chemically inert to beer.

The accessory can additionally be made of glasses such as soda lime and borosilicate, molded to a smooth, non-textured finish. Glasses are more elegant and esthetically pleasing than soapstone, but more expensive to accurately tool. Glass is sufficiently dense to gently sink to the bottom of drink ware when filled with beverage. Glass does not absorb beer, does not erode in beer, does not impart flavor to beer, and is chemically inert to beer The accessory can also be fashioned out of hard metals such as stainless steel, aluminum and aluminum alloys, copper and copper alloys. These materials are extremely inexpensive to custom tool. They are attractive, dishwasher-safe and resist rusting.

With all preferred materials, nucleation sites can be created by sandblasting, engraving, etching or lasering. For simplicity, the options of sandblasting, engraving, etching, carving or lasering nucleation sites into the accessory will be referred to as etching, with the understanding that any of these methods can be used to create nucleation sites.

REFERENCE NUMBERS

Figure 1:
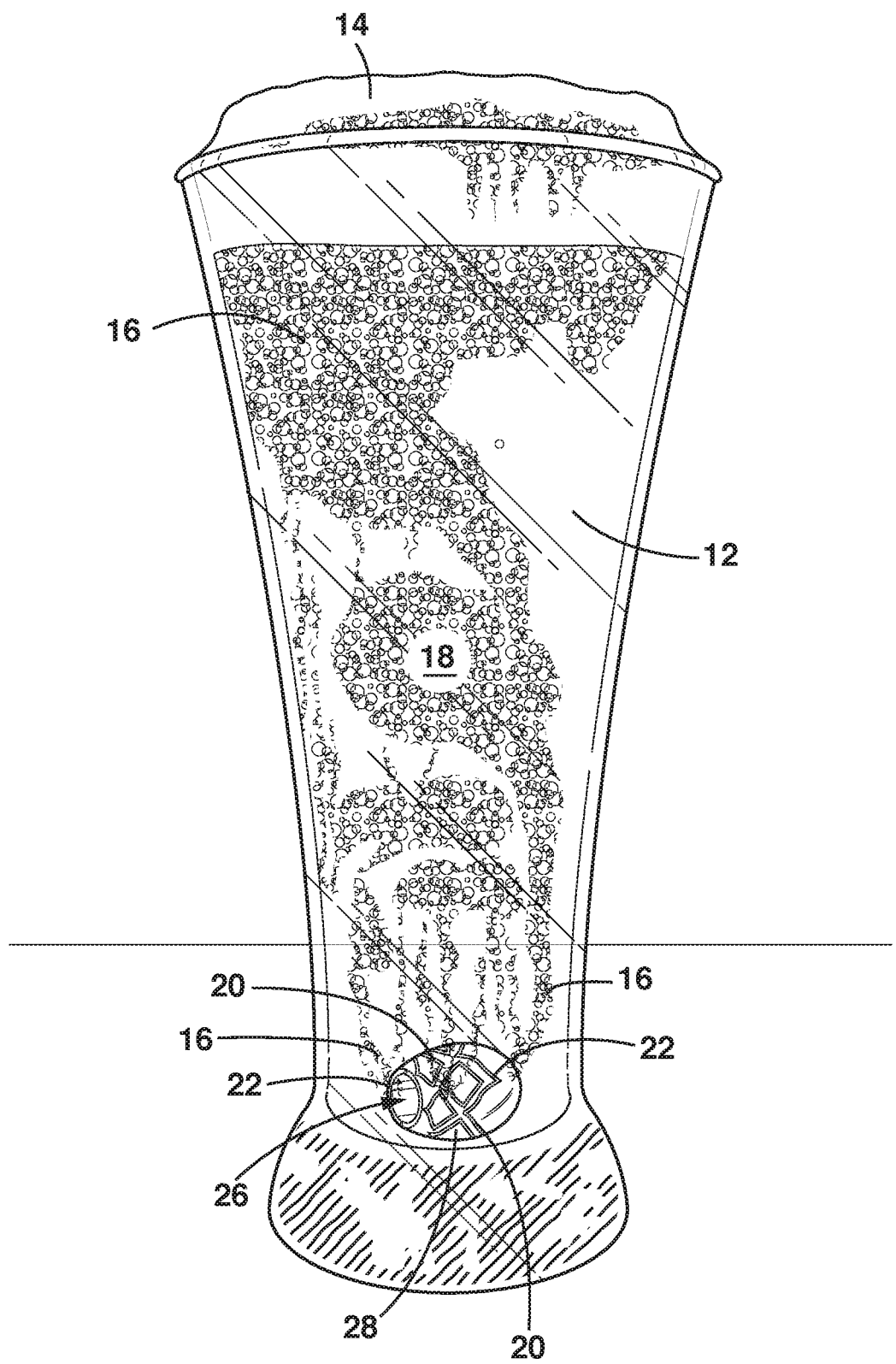
FIG. 1 is a perspective view of the nucleation accessory, in use, in drink ware.
Figure 2:
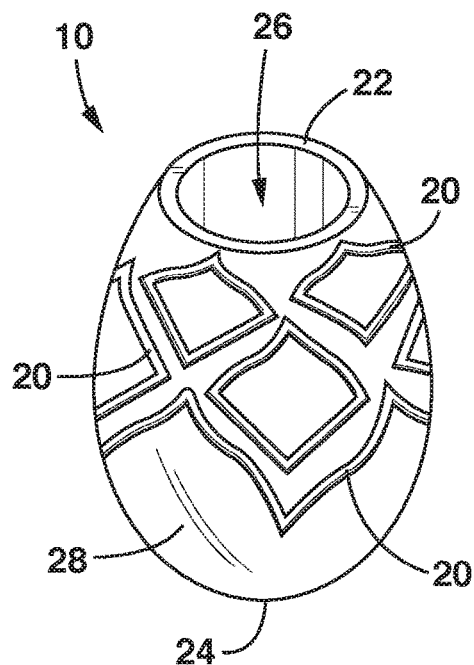
FIG. 2 is a perspective view of one embodiment of a nucleation accessory.
Figure 3:
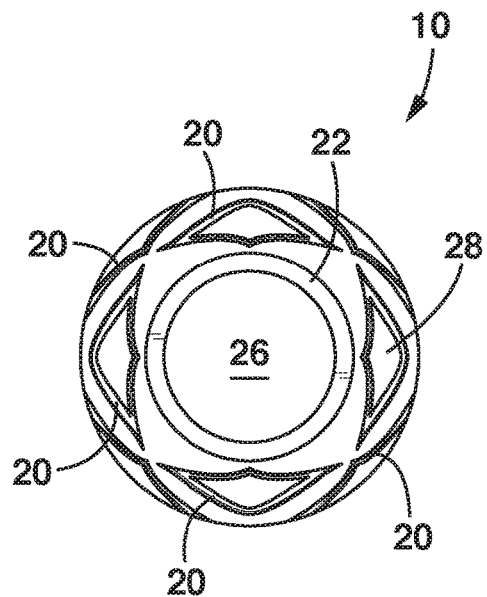
FIG. 3 is a top view thereof.
Figure 4:
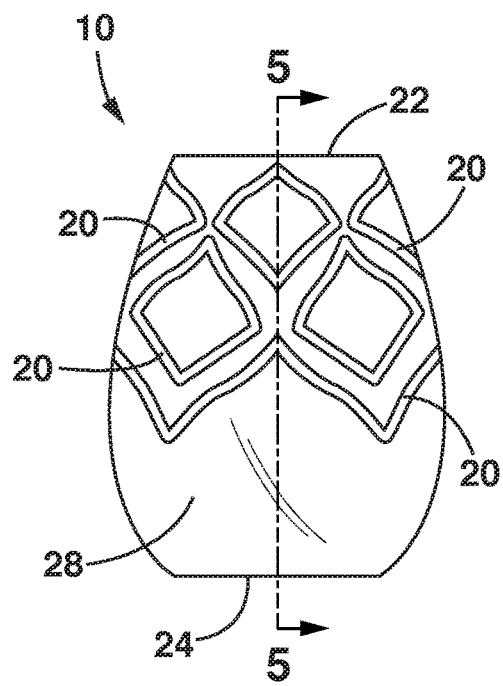
FIG. 4 is a front view thereof.
Figure 5:
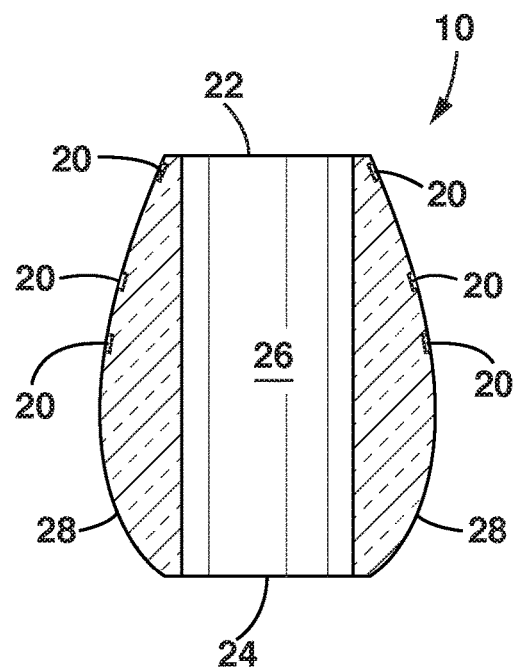
FIG. 5 is a section view taken from FIG. 4.
Figure 6:
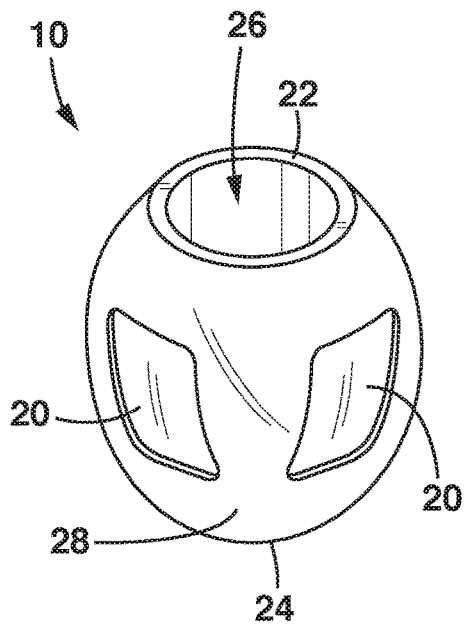
FIG. 6 is a perspective view of another embodiment of a nucleation accessory.
Figure 7:
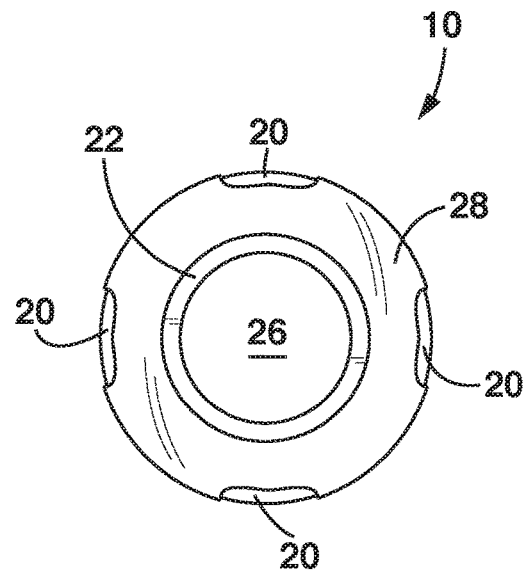
FIG. 7 is a top view thereof.
Figure 8:
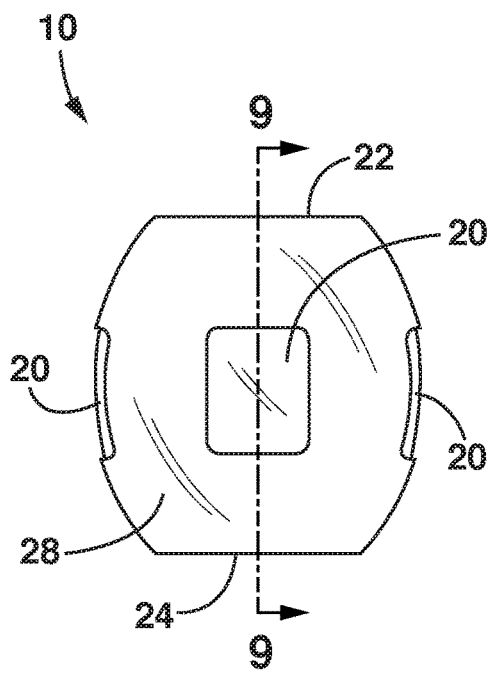
FIG. 8 is a front view thereof.
Figure 9:
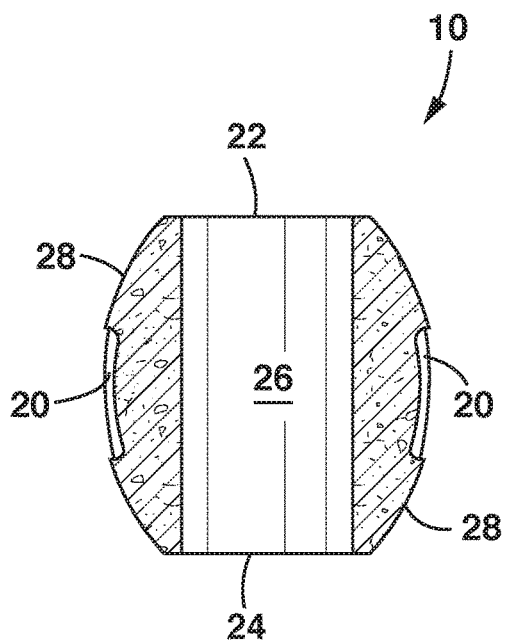
FIG. 9 is a section view taken from FIG. 8.

10 nucleation accessory
12 drink ware
14 head of foam
16 bubbles rising to a top surface of the beverage
18 beverage
20 nucleation sites
22 top
24 bottom
26 cylindrical hole
28 outer surface

DETAILED DESCRIPTION OF THE INVENTION

FIG. 1 shows a perspective view of drink ware 12, filled with a beverage 18 and a nucleation accessory 10. Note the several, intricate lines 20 etched into an outer surface 28 of each accessory. What appears to a naked eye as continuous lines are individual nucleation sites for the gas dissolved within the beverage to accumulate and form visible and tangible bubbles. Each nucleation site is 0.025-0.063 cm deep. The more nucleation sites, the greater the surface area available for gas bubble nucleation, and the greater, longer lasting and denser the head of foam the accessory can generate. The surface of the cylindrical hole 26 can be etched with additional nucleation sites, in any pattern, for even further nucleation power.

In practice, a user sinks one or more nucleation accessories into empty drink ware, then pours a beverage containing dissolved gas over the accessories. Alternatively, the beverage can be poured before the accessory. Carbon dioxide gas dissolved in the beverage attaches to and collects within nucleation sites etched into the outer surface, and optionally an inner surface, generating a copious head of foam.

Preferably, the accessory has a length, a width and a height comparable to a large olive, about 2.5-3.175 cm in each dimension. This size allows a user to discreetly carry the accessory in a pants pocket or handbag. However, other dimensions are possible within the letter and spirit of this invention.

The accessory further has a top, a bottom and an outer surface. The height may be slightly longer than the length and width. The top and bottom further each have a diameter. The diameter of the top may be equal to or different from the diameter of the bottom. These dimensions can also be varied. The accessory has a centrally axial cylindrical hole about 1-1.25 cm in diameter.

FIGS. 2-5 show a perspective, top, front and section view, respectively, of one embodiment of the invention, shaped to suggest the flower of the hop plant. This embodiment is shown with what appear to a naked eye as two parallel rows of zigzag lines etched at the equator of an outer surface of the accessory. Nested within a valley of each zigzag appear etched a diamond, each side of the diamond comprised of two parallel lines. Nested above and within each valley created by adjacent such diamonds appears as another diamond comprised of two parallel etched lines. There appears thus a single circumferential zigzag line and two rows of nested diamonds thereabove. The cylindrical hole 26 in this embodiment is shown free of nucleation sites, but it is possible to create nucleation sites in this surface as well, to provide further surface area for accumulating dissolved gas into bubbles.

FIGS. 6-9 show a perspective, top, front and section view, respectively, of a second embodiment of the invention. This embodiment suggests an olive, but as above, other three dimensional shapes and proportions fall within the scope of this invention. Note the diameter of the top and the bottom are the same. Four two-dimensional rectangular areas 20 of nucleation sites are etched out of the outer surface of the accessory, at regular intervals about the equator of the accessory. Other shapes and nucleation site patterns can be used, all within the letter and spirit of this invention.

I claim:

1. A method comprising:
    placing a nucleation accessory into a beverage container, wherein the nucleation accessory includes a body that includes top and bottom surfaces and a rounded outer surface that extends around an axis between the top and the bottom surfaces, and wherein the body includes a bore extending completely through the body from the top surface to the bottom surface along the axis, and at least one recess in the rounded outer surface of the body, wherein the bore further includes at least one recess formed on a surface thereof facing the axis;
    pouring a beer into the beverage container that includes the nucleation accessory, wherein a carbon dioxide gas is dissolved within the beer, and wherein the carbon dioxide gas attaches to the at least one recess in the outer surface of the body and to the at least one recess formed on the surface of the bore facing the axis; and
    generating, by the at least one recess in the outer surface of the body and the at least one recess formed on the surface of the bore facing the axis, bubbles within the beer due to gas bubble nucleation to generate a head of foam.

2. The method of claim 1, wherein the at least one recess in the outer surface comprises a plurality of lines etched into the outer surface.

3. The method of claim 2, wherein the plurality of lines comprises a zigzag line that extends circumferentially around an entirety of the outer surface.

4. The method of claim 3, wherein the plurality of lines further includes a first plurality of diamond shaped lines etched in the outer surface between the zigzag line and the top surface, and a second plurality of diamond shaped lines etched in the outer surface between the first plurality of diamond shaped lines and the top surface.

5. The method of claim 1, wherein the at least one recess in the outer surface is a rectangular recess etched into the outer surface of the body.

6. The method of claim 1, wherein the at least one recess in the outer surface is etched in the outer surface at a depth between 0.025-0.063 centimeters.

7. The method of claim 1, wherein the nucleation accessory is made of a material that is chemically inert to the beer and the carbon dioxide gas, non-porous to the beer and the carbon dioxide gas, and does not erode in the beer or the carbon dioxide gas.

8. A method comprising:
    pouring a beer into a beverage container, wherein a carbon dioxide gas is dissolved within the beer;
    placing a nucleation accessory into the beer within the beverage container, wherein the nucleation accessory includes a body that includes top and bottom surfaces and a rounded outer surface that extends around an axis between the top and the bottom surfaces, wherein the body includes a bore extending completely through the body from the top surface to the bottom surface along the axis, at least one recess in the rounded outer surface of the body, and at least one recess formed on a surface of the bore facing the axis, and wherein the carbon dioxide gas attaches to the at least one recess in the rounded outer surface of the body and to the at least one recess on the surface of the bore facing the axis; and
    generating, by the at least one recess in the rounded outer surface of the body and the at least one recess on the surface of the bore facing the axis, bubbles within the beer due to gas bubble nucleation to generate a head of foam.

9. The method of claim 8, wherein the at least one recess in the outer surface comprises a plurality of lines etched into the outer surface.

10. The method of claim 9, wherein the plurality of lines comprises a zigzag line that extends circumferentially around an entirety of the outer surface.

11. The method of claim 10, wherein the plurality of lines further includes a first plurality of diamond shaped lines etched in the outer surface between the zigzag line and the top surface, and a second plurality of diamond shaped lines etched in the outer surface between the first plurality of diamond shaped lines and the top surface.

12. The method of claim 11, wherein the at least one recess in the outer surface is a rectangular recess etched into the outer surface of the body.

13. The method of claim 11, wherein the at least one recess in the outer surface is etched in the outer surface at a depth between 0.025-0.063 centimeters.

14. The method of claim 11, wherein the nucleation accessory is made of a material that is chemically inert to the beer and the carbon dioxide gas, non-porous to the beer and the carbon dioxide gas, and does not erode in the beer or the carbon dioxide gas.

15. A method comprising:
    submerging a nucleation accessory within a carbonated beverage, wherein the nucleation accessory includes a body that includes a top surface, a bottom surface, an outer surface that extends between the top surface and the bottom surface and around an axis, and a bore that extends completely through the body between the top surface and the bottom surface along the axis, and wherein the outer surface includes a plurality of recesses within the outer surface at a depth of 0.025-0.063 centimeters, and wherein carbon dioxide dissolved in the carbonated beverage attaches to the plurality of recesses; and
    generating, by the plurality of recesses, bubbles within the carbonated beverage due to gas bubble nucleation, wherein the plurality of recesses in the outer surface includes a zigzag line that extends circumferentially around an entirety of the outer surface, a first plurality of diamond shaped lines etched in the outer surface between the zigzag line and the top surface, and a second plurality of diamond shaped lines etched in the outer surface between the first plurality of diamond shaped lines and the top surface,
    wherein the bore further includes a plurality of recesses on a surface thereof facing the axis, such that bubbles are also generated within the carbonated beverage due to gas bubble nucleation by the plurality of recesses on the surface of the bore facing the axis.

* * * * *